Nov. 4, 1958  E. W. DUNBAR  2,858,571
METHOD OF MAKING RUBBER SOLES
Filed March 22, 1955
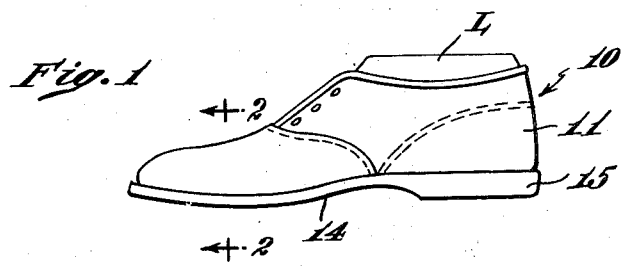
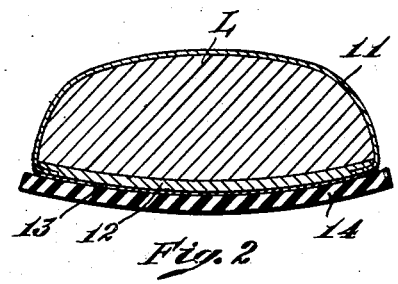
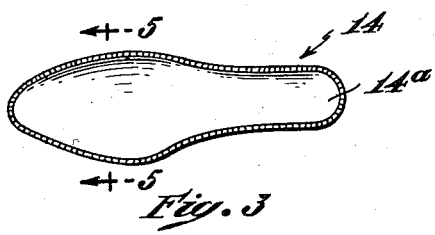
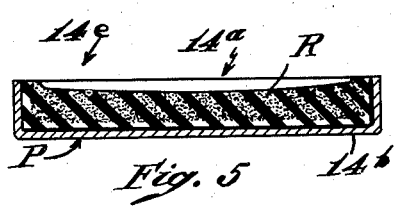
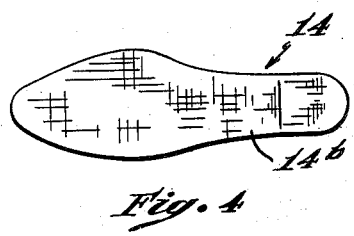
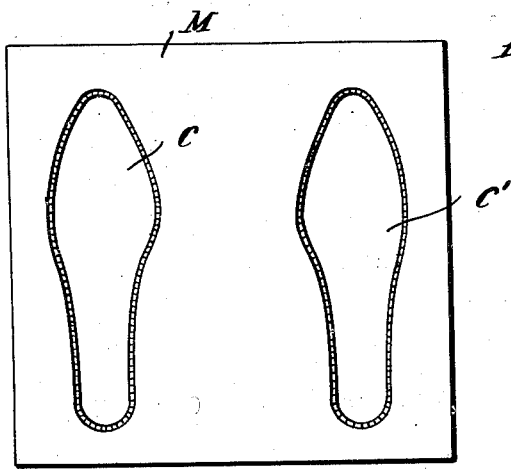
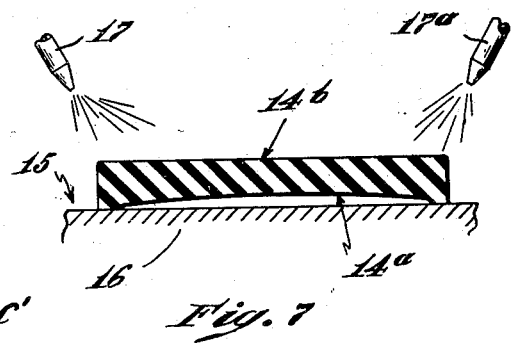
Inventor
Ernest W. Dunbar
by Roberts Cushman Grover
Attys

United States Patent Office 2,858,571
Patented Nov. 4, 1958

2,858,571

METHOD OF MAKING RUBBER SOLES

Ernest W. Dunbar, Taneytown, Md., assignor to Cambridge Rubber Company, Taneytown, Md., a corporation of Maryland Application March 22, 1955, Serial No. 495,961

2 Claims. (Cl. 18—53)

This invention pertains to the manufacture of footwear, particularly to footwear of the kind wherein the outer sole is of rubber, and relates more especially to a novel method of preparing rubber soles in readiness for assembly with the other parts of a lasted shoe to a novel sole resultant from the practice of said method and to a novel method of making rubber soled shoes.

Customary practice in the manufacture of an article of footwear having a rubber sole comprises the preparation of the lasted shoe or boot including the upper and bottom structure (not including the outer sole), the preparation of a fully vulcanized outer sole, the assembly of the outer sole with the lasted shoe, and the bonding of the outer sole to the shoe bottom structure by the use of an appropriate cement.

The outer sole is customarily molded by the use of rigid molds which impart to the rubber compound the desired shape, surface configuration, etc., the rubber compound being vulcanized while in the mold and under pressure. When the molded rubber sole is removed from the mold, that surface of the sole which is to be contacted with the bottom of the lasted shoe is dense and non-absorbent, so that the cements employed for use in bonding the parts together do not adhere to the surface of the vulcanized sole with the tenacity required to insure a strong and permanent connection between the sole and shoe bottom. Because of this situation it has become customary, as a preliminary step in the assembly operation, to subject that surface of the rubber sole which is to receive the cement to a roughening operation, for instance, by exposing it to the action of a rotating roll provided with saw-like teeth, to a rotating wire brush, or to an abrasive wheel, with the object of removing the dense surface layer or at least to form a multitude of minute scratches or furrows in said surface, or even to raise a nap, thereby to afford to the cement a "tooth" or anchorage such as to insure a permanent bond between the shoe bottom and sole.

The roughening operation removes a portion of the vulcanized rubber which is thus wasted, but, much more important, the roughening operation is an extra step in the manufacturing process involving as cost items operators' wages, capital investment, and power for driving the machine, etc., as well as the time loss, which cuts down the rate of production. Moreover, after the sole has been roughened, it must be held in assembly with the lasted shoe and under pressure for an appreciable time to complete the adhesive bond.

The present invention has for an object the provision of a novel method for making rubber soled footwear whereby the cost and time consumed are substantially reduced as compared with customary procedures. A further object is to provide a novel method of making rubber soled footwear such that the customary practice of roughening the sole before assembly with the lasted shoe is unnecessary. A further object is to provide a novel method of making rubber soled footwear such as to provide a more effective bond between the sole and lasted shoe than has customarily been obtainable. A further object is to provide a novel method of making shoes such that vulcanization of the sole and its attachment to the lasted shoe are accomplished in a single operation. A further object is to provide a novel method of preparing a rubber sole in readiness for assembly with a lasted shoe. A further object is to provide a novel rubber sole ready for adhesive attachment to the bottom of a lasted shoe. Other and further objects and advantages of the invention will be pointed out in the following more detailed description and by reference to the accompanying drawings, wherein:

Fig. 1 is a side elevation of a shoe of a type such as may be made in accordance with the practice of the present invention;

Fig. 2 is a diagrammatic transverse section substantially on the line 2—2 of Fig. 1;

Fig. 3 is a plan view of a rubber outer sole according to the present invention;

Fig. 4 is a bottom view of the sole shown in Fig. 3;

Fig. 5 is a transverse section on the line 5—5 of Fig. 3, but to larger scale;

Fig. 6 is a diagrammatic view of one of the parts of a mold of a type which may be used in making the rubber outer sole, and Fig. 7 is a diagrammatic vertical section illustrating one of the steps in the method of making the rubber sole.

While herein reference is made to "rubber" as the material of which the sole is made, it is to be understood that the term rubber as so used is merely by way of example, and is not intended as a limitation, but is designed to include not only natural and synthetic rubbers and compounds thereof containing suitable curing agents and accelerators, but also to include compounds comprising, in addition to the rubber, inert fillers, for instance comminuted cork, fibers of various kinds or mineral substances such as talc, mica or abrasives, while the rubber itself may be of the crepe, sponge or cellular form.

In accordance with the present invention, the selected rubber compound in the dough state and preferably in pellet form is introduced in measured amount into the cavity of a mold, usually a two-part mold and subjected to pressure, usually with heat, so as to conform the mass to the shape of the mold cavity. However, this molding operation is carried out at a temperature so low and for a period so short that the rubber is not fully cured, although the molded mass or embryo sole is sufficiently coherent to permit it to be removed from the mold. However, it is still in a more or less tacky condition. This embryo sole is now laid on a substantially flat surface, for instance a table or conveyor belt, with its bottom or ground-contacting surface up and with that side which will be cemented to the shoe bottom resting on the support, and the exposed bottom surface and edge surfaces of the embryo sole are now treated with a suitable reagent, for instance a suitable acid, which so reacts with the rubber compound as to produce a thin layer or film which is substantially non-tacky and which in its general physical characteristics resembles fully cured or vulcanized rubber. After this treatment the embryo sole may be handled freely without losing its molded shape, for although the major portion of the sole is still in a partially cured state, the external contour of the sole is maintained by the cured surface layers. However, the upper surface of the sole, that is to say, the surface which is to be cemented to the lasted shoe upper, still retains the initial tacky character of the partially cured rubber, and this partially cured material is so compatible with the cement employed for attaching the sole to the shoe bottom that the cement forms with the sole a substantially integral union whereby an adequate and permanent bond is secured when the sole and lasted shoe are assembled and subjected to pressure.

In accordance with the present invention, the assembled parts, that is to say, the embryo sole and the lasted shoe upper, with cement (usually a layer coating the sole surface) interposed between them, are subjected to proper pressure and temperature conditions for a period of time sufficient to complete the curing of the material of the sole, and during this period the cement becomes fully set, thus permanently uniting the parts.

It may be noted at this point that because the initial partial curing of the sole requires but a short period of time as compared with that requisite for obtaining a complete cure, and since the cement bonding of the sole to the shoe bottom structure is combined with the final curing operation, the entire time required in the preparation of the sole and its attachment to the shoe bottom is substantially reduced, as compared with usual practice, while the time required for the customary roughening operation is completely eliminated.

Referring to the drawings, the numeral 10 designates a shoe which may be of any usual or customary type, and wherein the upper 11 is of any desired material, for example cloth or chrome tanned leather, it being understood that the upper may be made and lasted on the last L in accordance with any customary procedure, and according to whether the shoe is to be made by methods commonly employed in leather shoe manufacture or in rubber shoe manufacture. As illustrated in Fig. 2, the lasted shoe comprises the upper 11 and an element 12 which may for example be a conventional inner sole, a sock lining or a ply of rag stock according to the particular type of shoe being made. As shown in Figs. 1 and 2, the shoe has a rubber outer sole 14 which is united to the bottom structure of the lasted shoe, that is to say, to the member 12 and the lasted-in margins of the upper, by means of an interposed layer or film 13 of an appropriate cement. It will be understood that the shoe thus described is merely by way of example, and that Figs. 1 and 2 are not intended to disclose all of the customary details involved in making the conventional shoe.

In accordance with the present invention, the rubber outer sole 14 is made by placing within the cavities C, C' of a mold M (Fig. 6) a measured quantity of the selected rubber compound. For convenience in handling and measuring, the rubber compound may be in pelleted form, although this is not essential to the invention. Having placed the proper quantity of rubber compound in the cavities C, C' of the mold, the other mold part (not shown) is assembled with part M and subjected to pressure at an elevated temperature for a predetermined length of time sufficient to coalesce the rubber particles and conform the mass of rubber to the shape of the mold cavity. However, the time and temperature are such that the rubber compound is not fully vulcanized, but preferably retains to a certain extent its original doughy consistency and surface tackiness, although it is sufficiently coherent to permit it to be removed from its mold cavity as a unit, which is hereinafter referred to as the embryo sole. This embryo sole 14e (Fig. 7) is laid upper side down on a substantially flat horizontal surface 15 provided by any suitable support 16, for example a bench, table or a belt conveyor, and while on this support the exposed surfaces, that is to say, the edges and that surface 14b which, in the completed shoe contacts the ground, are sprayed, as by means of spray nozzles 17 and 17a, with a suitable re-agent which hardens and toughens the exposed surface of the rubber, in fact providing a surface vulcanization, thereby producing a thin film or layer P at the bottom surface and edges of the embryo sole which is of a character such as to maintain the contour of the embryo sole while it is being handled, and which is not tacky or adherent to objects with which it may be brought in contact. However, the main body R of the sole is still in the partially cured unvulcanized condition, and the surface 14a, which is the top surface of the sole, is in the same state as before the acid treatment, that is to say, it retains the characteristics of the rubber which it had at the end of the molding operation. This surface 14a is thus somewhat tacky, and when cement of a proper type is applied to this surface the cement makes a substantially integral bond with the rubber. The soles in the condition illustrated for example in Fig. 5, may now be stored for a substantial length of time if desired before assembly with the lasted shoe upper. However, when the sole is to be applied to the lasted upper, the bottom structure of the lasted upper is coated with cement 13 (Fig. 2) or the surface 14a of the sole may thus be coated, or if desired, both surfaces may be coated with cement, and then the sole is registered with the bottom of the lasted shoe, so that the cement coating is interposed between the bottom structure and the rubber outer sole. The parts are held pressed firmly together in assembled relation while subjected to a conventional vulcanizing operation which, at one and the same time, completes the curing of the rubber and sets the cement layer.

As above noted, the cement forms a substantially integral bond with the rubber because of the characteristics of the rubber at the time the cementing operation takes place, so that it is no longer necessary to roughen the surface of the sole before its assembly with the lasted shoe, while on the other hand, the simultaneous vulcanization and setting of the cement produces so firm a bond between the outer sole and the shoe upper that the sole is retained in place more certainly than is true of soles applied according to customary prior practice.

The following are cited as examples of appropriate materials and procedures according to the present invention whereby the objects of invention above pointed out may be obtained.

*Example 1.*—A pelleted rubber compound of a conventional composition for use in making rubber shoe soles is subjected to a pressure of approximately 800 p. s. i. in a rigid mold for a period of approximately five to ten seconds and at a temperature of approximately 175° F. to 195° F. The molded material is then withdrawn from the mold cavity and laid upon a flat surface and exposed to a spray of acid of the kind which is known to the trade as "Butyl Eight" which is a rubber accelerator. It is a brown liquid; sp. gr. 1.01; partially soluble in water and gasoline, and soluble in acetone, alcohol, benzol, carbondisulfide and chloroform, and sold by R. T. Vanderbilt Co., Inc. of 521 West 57th Street, New York, N. Y., until its exposed surfaces are thoroughly wetted. It is then allowed to remain on the support for a period of a few seconds, for the surface to dry. The exposed surfaces of the molded material which have been sprayed will then be found to be firm and non-tacky. This embryo outer sole, the major portion of which is still only partially cured, is then assembled with a lasted shoe having a cloth upper prepared in accordance with customary rubber shoe manufacturing practice, the bottom of the lasted shoe having first been coated with a cement such as is customarily employed in attaching rubber soles. The assembly is then placed in a vulcanizer and subjected to a temperature of approximately 280° F. and a pressure of approximately 30 p. s. i. for a period of approximately 80 minutes.

*Example 2.*—Rubber compound including ground cork (such an ingredient is disclosed in the patent to Dunbar, No. 2,250,987, dated July 20, 1941), is subjected to a pressure of approximately 800 p. s. i. in a rigid mold for a period of approximately five to ten seconds and at a temperature of approximately 175° to 195° F. The molded material is then withdrawn from the mold cavity and laid upon a flat surface and exposed to a spray of acid of the kind which is sold under the trade name "Setsit 5" which is a rubber latex accelerator, sold by R. T.

Vanderbilt Co., Inc., supra, until its exposed surfaces are thoroughly wetted. It is then allowed to remain on the support for a period of a few seconds for the surface to dry. The exposed surfaces of the molded material which have been sprayed will then be found to be firm and non-tacky. This embryo outer sole, the major portion of which is still only partially cured, is now assembled with a lasted chrome-tanned leather shoe upper prepared in accordance with customary leather shoe manufacturing practice, the bottom of the lasted shoe having first been coated with a rubber cement such as is commonly used in attaching outer soles. The assembly is then placed in a vulcanizer and subjected to a temperature of approximately 280° F. and a pressure of approximately 30 p. s. i. for a period of approximately 80 minutes.

While certain desirable steps have been herein suggested as comprised in the improved method of shoe making, it is to be understood that the invention is broadly inclusive of any and all modifications falling within the scope of the appended claims.

I claim:

1. That method of making a rubber sole for use in footwear which comprises placing in a mold cavity a measured quantity of doughy rubber compound which, throughout, contains the same proportion of curing agent and accelerator, subjecting the entire body of rubber compound in the mold cavity to heat and pressure such as to conform it to the mold cavity and to cure the entire body of compound only sufficiently to make it coherent when removed from the mold cavity, removing the embryo sole thus formed from the mold cavity and while it still consists of doughy rubber compound, protecting that surface of the embryo sole which is to contact the shoe, and wetting the other exposed surfaces of the sole with a rubber accelerator such as to vulcanize said surfaces and make them non-tacky.

2. Method of making a rubber sole for use in footwear according to claim 1, wherein the rubber, while in the mold cavity, is subjected to a pressure of the order of 800 p. s. i. at a temperature of the order of 185° F. and for a period of from five to six seconds and, after removal of the molded mass from the mold, spraying those surfaces only of the molded mass which are to constitute the bottom and edges of the sole when in use with an acid rubber accelerator thereby to vulcanize said surfaces and make them non-tacky.

References Cited in the file of this patent

UNITED STATES PATENTS

| | | |
|---|---|---|
| 142,161 | Hayward | Aug. 26, 1873 |
| 1,289,662 | Clark | Dec. 31, 1918 |
| 1,533,008 | Keiser | Apr. 7, 1925 |
| 1,917,737 | Schacht | July 11, 1933 |
| 2,012,172 | Mitchell | Aug. 20, 1935 |
| 2,110,375 | Winkelmann | Mar. 8, 1938 |
| 2,580,245 | Rollman et al. | Dec. 25, 1951 |

FOREIGN PATENTS

| | | |
|---|---|---|
| 17,520 | Great Britain | Dec. 15, 1916 |
| 219,096 | Great Britain | July 21, 1924 |
| 660,163 | Great Britain | Oct. 31, 1951 |